United States Patent
Brown

(10) Patent No.: US 11,723,320 B2
(45) Date of Patent: Aug. 15, 2023

(54) ARBOR STAKE STABILIZATION MEMBER

(71) Applicant: Kristopher M. Brown, Dallas, TX (US)

(72) Inventor: Kristopher M. Brown, Dallas, TX (US)

(73) Assignee: Kristopher M. Brown, Dallas, TX (US)

( * ) Notice: Subject to any disclaimer, the term of this patent is extended or adjusted under 35 U.S.C. 154(b) by 0 days.

(21) Appl. No.: 16/697,677

(22) Filed: Nov. 27, 2019

(65) Prior Publication Data

US 2020/0163287 A1 May 28, 2020

Related U.S. Application Data

(60) Provisional application No. 62/771,684, filed on Nov. 27, 2018.

(51) Int. Cl.
 *A01G 17/04* (2006.01)

(52) U.S. Cl.
 CPC .................................. *A01G 17/04* (2013.01)

(58) Field of Classification Search
 CPC .... A01G 9/122; A01G 9/124; A01G 13/0237; A01G 13/0293; A01G 17/04; A01G 17/06
 USPC ....................... 47/32, 32.7, 42, 43
 See application file for complete search history.

(56) References Cited

U.S. PATENT DOCUMENTS

| | | | |
|---|---|---|---|
| 3,315,411 A * | 4/1967 | Fitzgerald | A01G 17/14 47/43 |
| 4,584,792 A | 4/1986 | Etzel | |
| 4,590,705 A * | 5/1986 | Prince | A01G 13/0281 47/32 |

(Continued)

FOREIGN PATENT DOCUMENTS

| | | | |
|---|---|---|---|
| DE | 3504112 A1 * | 8/1986 | ......... A01G 13/0281 |
| DE | 10131104 A1 * | 1/2003 | ......... A01G 13/0293 |

(Continued)

OTHER PUBLICATIONS

English-language translation of EP 2505718 A1 (Year: 2012).*

(Continued)

*Primary Examiner* — Monica L Perry
*Assistant Examiner* — Aaron M Rodziwicz
(74) *Attorney, Agent, or Firm* — Scott Griggs; Griggs Bergen LLP

(57) ABSTRACT

In one embodiment of an arbor stake stabilization member, a body includes an annular ring of a biodegradable material having an axial passageway therethrough. A locking member is coupled to the annular ring and extends radially inward into the axial passageway. A plate of a biodegradable material extends circumferentially outwardly from the annular ring. The perforated plate includes multiple openings. In use, the arbor stake stabilization member may be placed underground and on or above a rootball of a tree. The locking member is sized to accept an arbor stake therethrough in an interference fit. The arbor stake may extend from the top of the rootball through the rootball and into the undisturbed soil at a point below the rootball. Over time, the arbor stake stabilization member biodegrades.

10 Claims, 3 Drawing Sheets

(56) References Cited

U.S. PATENT DOCUMENTS

| | | | |
|---|---|---|---|
| 4,677,788 A * | 7/1987 | Mastandrea | A01G 9/122 |
| | | | 47/47 |
| 5,430,971 A | 7/1995 | Myer | |
| 6,141,903 A | 11/2000 | Mancini | |
| 6,625,926 B1 * | 9/2003 | Mancini | A01G 17/04 |
| | | | 47/32.5 |
| 8,316,579 B1 | 11/2012 | Brown | |
| 8,567,118 B2 | 10/2013 | Farmer et al. | |
| D738,190 S * | 9/2015 | Davtian | D8/349 |
| 9,894,846 B1 | 2/2018 | Young | |
| 2005/0132645 A1 | 6/2005 | Johns | |
| 2006/0185232 A1 | 8/2006 | Spicer | |
| 2012/0000123 A1 | 1/2012 | Donaldson | |
| 2015/0020858 A1 * | 1/2015 | Kubert | A45C 13/02 |
| | | | 135/118 |
| 2016/0219798 A1 * | 8/2016 | Bowie | E01C 9/005 |
| 2017/0172073 A1 | 6/2017 | Van Den Heever | |
| 2020/0068812 A1 * | 3/2020 | Patterson | A01G 9/12 |

FOREIGN PATENT DOCUMENTS

| | | | | |
|---|---|---|---|---|
| EP | 2505718 A1 * | 10/2012 | | A01G 13/0293 |
| EP | 3130219 | 4/2018 | | |
| GB | 191212899 A * | 3/1913 | | A01G 9/124 |

OTHER PUBLICATIONS

English-language translation of Gruber, DE 10131104 A1 (Year: 2003).*

International Searching Authority, Written Opinion of the International Searching Authority, dated Jan. 5, 2020, Alexandria, Virginia.

* cited by examiner

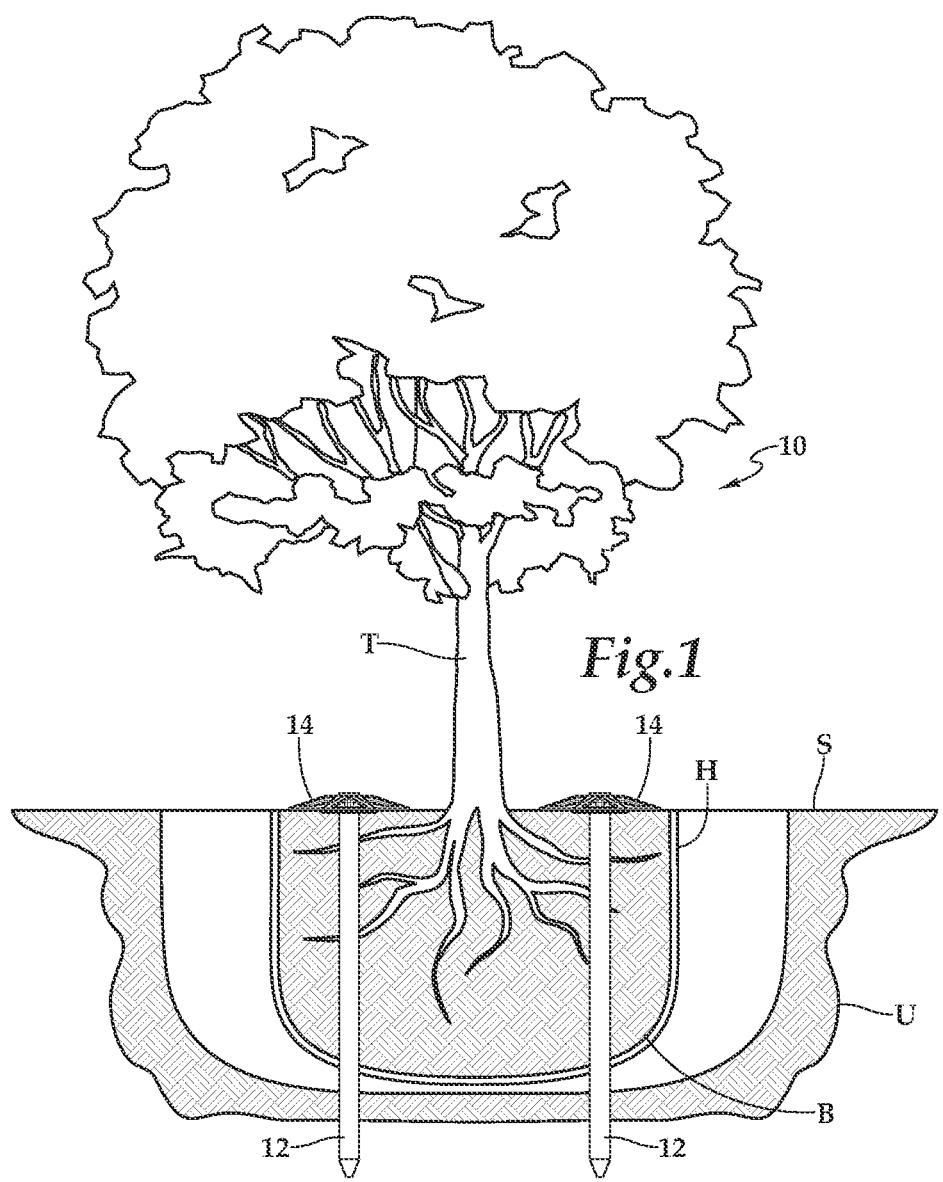
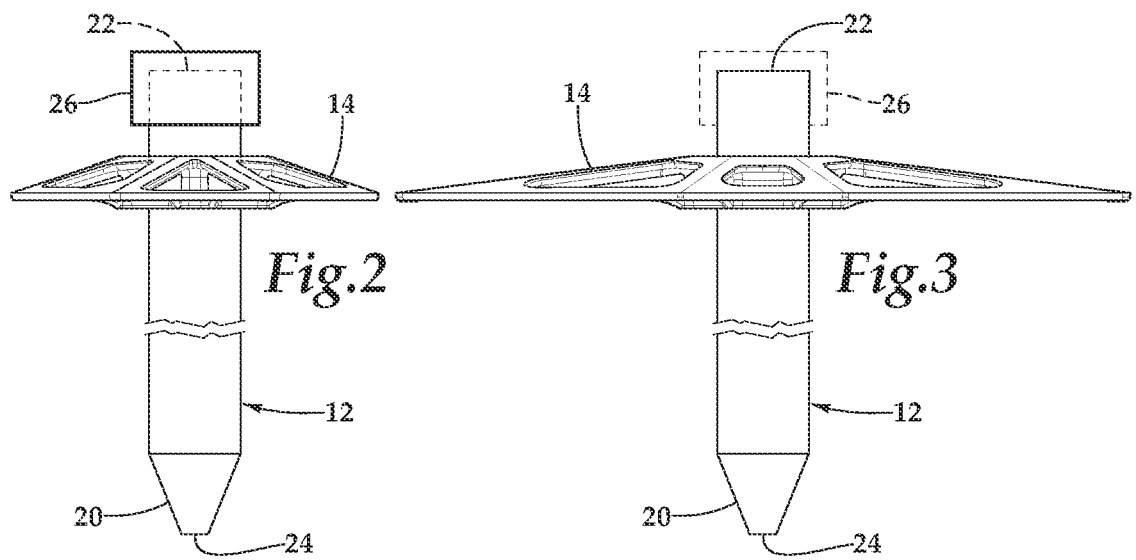
Fig.1
Fig.2
Fig.3

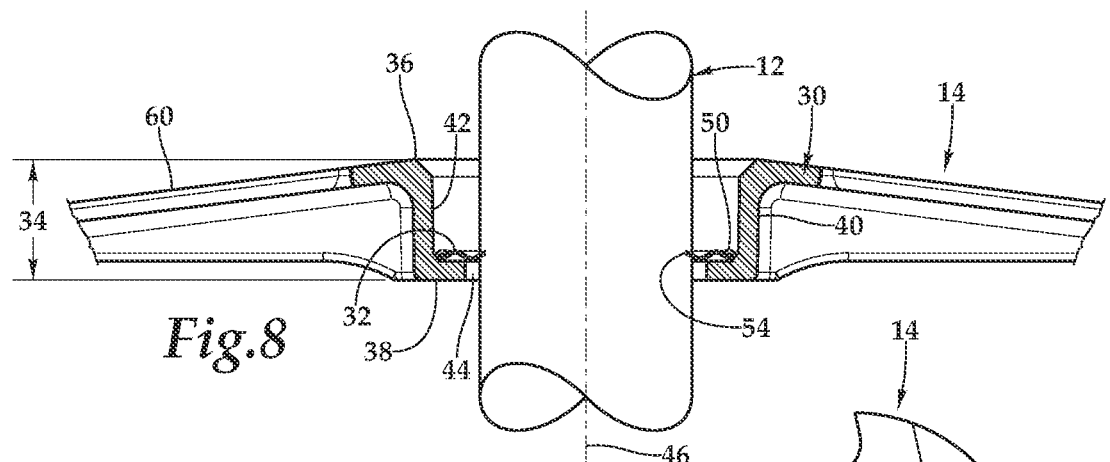
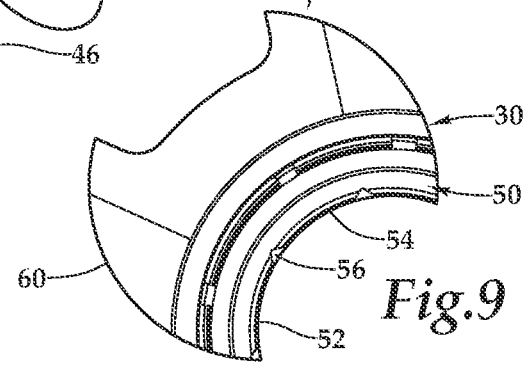
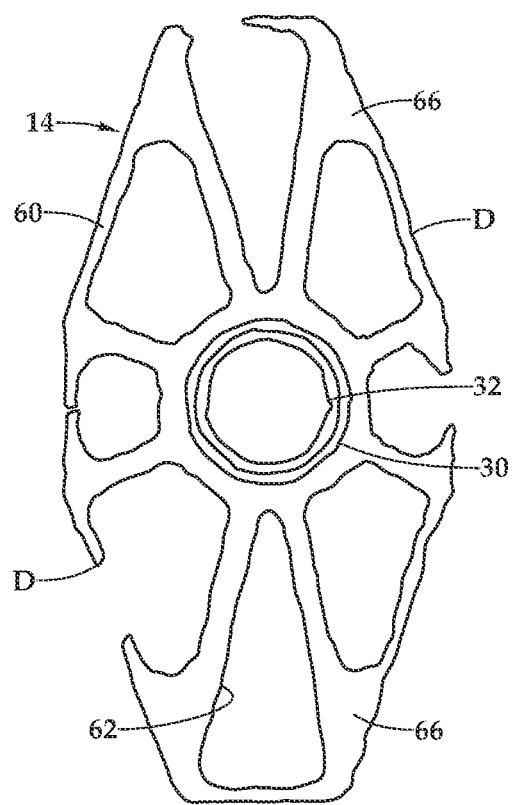
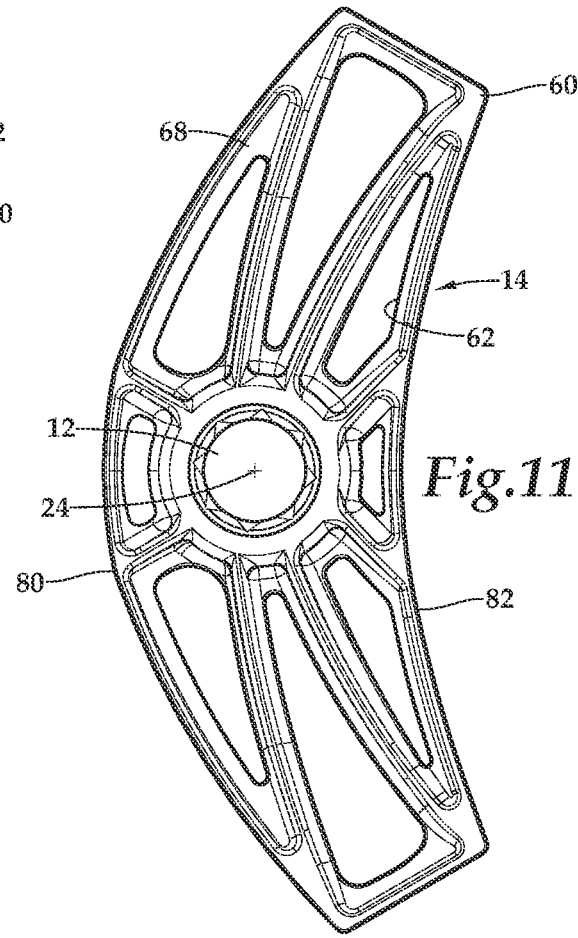

ARBOR STAKE STABILIZATION MEMBER

PRIORITY STATEMENT & CROSS-REFERENCE TO RELATED APPLICATION

This application claims priority from U.S. Patent Application Ser. No. 62/771,684 entitled "Arbor Stake Stabilization Member" filed on Nov. 27, 2018, in the name of Kristopher M. Brown; which is hereby incorporated by reference for all purposes.

TECHNICAL FIELD OF THE INVENTION

This invention relates, in general, to landscaping and, in particular, an arbor stake stabilization member that provides a physical security to trees, shrubs, and the like.

BACKGROUND OF THE INVENTION

Landscape contractors often work on projects that include planting trees, shrubs, or other items. Trees are typically received with their root mass in a container or wrapped in burlap and the roots will be in a compact cluster called a rootball. The rootball is placed into a hole and covered with soil. Newly installed tall trees and shrubs typically benefit from the use of various stabilization techniques to ensure an upright habit during establishment, even in spite of periodic strong winds and other stimuli. After one to two years, the roots of most plants will have become established to the point that there is no need for external stabilization.

The most popular tree stabilization technique is the use of metal fencing T-posts that are driven into the ground and stick up out of the ground by about three to five feet. Each T-post may have a guy wire, rope or other supporting structure that is attached to the trunk of the tree and operates to stabilize the tree. However, this above-ground staking technique has several disadvantages. One of the major disadvantages of above-ground staking methods is the effect on the physiology of trees—the methods may inhibit tree growth and structural strength. Above-ground staking acts as a crutch by preventing the trunk from swaying in the wind. Such swaying is believed to stimulate and grow bark cambium to add to the trunk strength. This natural movement also triggers growth and root proliferation of the rootball into the surrounding soil structure. Above-ground staking greatly inhibits this natural adaptation. Further, the people who maintain these traditional methods are often careless and fail to remove the staking structures after they are not needed. A tree that is left indefinitely with support structures on or around its trunk will attempt to defend itself by compartmentalizing (covering the foreign object with callus material eventually overcoming the foreign object). Wires and other surrounding support structures left on a tree trunk may girdle the tree whereby causing a permanent inclusion which often leads to catastrophic structural failure and death of the tree.

Further, above-ground staking is unsightly and hazardous to humans and machinery. For instance, in an open space environment such as a park, there will be children running around. Oftentimes, trees are planted near playgrounds, trails and other recreational activities. The height of vertical posts and support structures are coincidentally installed at or about the height of a child's torso, head or face, making collisions with above ground staking methods quite dangerous. Accordingly, there is a need for improved systems and methods for providing enhanced tree stabilization.

SUMMARY OF THE INVENTION

It would be advantageous to achieve an arbor stake stabilization member that would improve upon existing limitations systems and methods for providing enhanced tree stabilization. It would also be desirable to enable an eco-friendly and sustainable solution that would provide enhanced aesthetics, safety with no impact to the health and success of the tree. To better address one or more of these concerns, an arbor stake stabilization member is disclosed. In one embodiment of the arbor stake stabilization member, a body includes an annular ring of a biodegradable material having an axial passageway therethrough. A locking member is coupled to the annular ring and extends radially inward into the axial passageway. A plate of a biodegradable material extends circumferentially outwardly from the annular ring. The perforated plate includes multiple openings. In use, the arbor stake stabilization member may be placed underground and on or above a rootball of a tree. The locking member is sized to accept an arbor stake therethrough in an interference fit. The arbor stake may extend from the top of the rootball through the rootball and into the undisturbed soil at a point below the rootball. Over time, the arbor stake stabilization member biodegrades. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a system for landscape stabilization utilizing multiple arbor stake stabilization members according to the teachings presented herein during an installation of a tree;

FIG. 2 is a front elevation view depicting one embodiment of the system of FIG. 1 including an arbor stake stabilization member and an arbor stake in additional detail;

FIG. 3 is a side elevation view depicting one embodiment of the system of FIG. 1 in additional detail;

FIG. 8 is a partial cross-sectional view of the system depicted in FIG. 3 including the arbor stake stabilization member and the arbor stake;

FIG. 9 is a top plan view depicting additional detail of the arbor stake stabilization member depicted in FIG. 7;

FIG. 10 is a top plan view of the arbor stake stabilization member depicted in FIG. 6 following utilization and a lapse of time; and FIG. 11 is a top plan view of another embodiment of an arbor stake stabilization member according to the the teachings presented herein.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the present invention.

Referring initially to FIG. 1, therein is depicted one embodiment of a system 10 for landscape stabilization. A tree T includes a rootball B, which is disposed in hole H under the surface S. Placing a rootball in a hole is a common scenario in landscaping when planting trees, shrubs, and other plants. In the presently illustrated embodiment after the hole H has been dug, the tree T is installed. Arbor stakes 12 and Arbor stake stabilization members 14 are utilized to stabilize the tree T. More specifically, arbor stake stabilization members 14 are positioned at or under the surface S and then respective arbor stakes 12 driven through rootball B into native, undisturbed soil U so that rootball B is held in place by the arbor stakes 12. Typically, the arbor stakes 12 are driven in as far as possible so that the tree T will experience increased stability versus having no stabilization system 10 at all. The arbor stake stabilization members 14 provide stability for the arbor stakes 12 by holding the arbor stakes 12 in place, preventing lateral movement.

The system 10 shown in FIG. 1 may be analogized to a system for stabilizing a ball (rootball B) in a socket (hole H). Generally speaking, if there is a ball in a socket and pins are run through that ball and into the socket, that ball will not typically roll around in the socket. Embodiments of the invention offer additional stability in the form of the arbor stake stabilization members 14. The arbor stake stabilization members 14 provide a way of securing the pins (arbor stakes 12) against ball and socket movement. Generally, the more arbor stakes 12 and arbor stake stabilization members 14 that are used, the more stability that is imparted to the tree T (or other plant).

Figure 4:
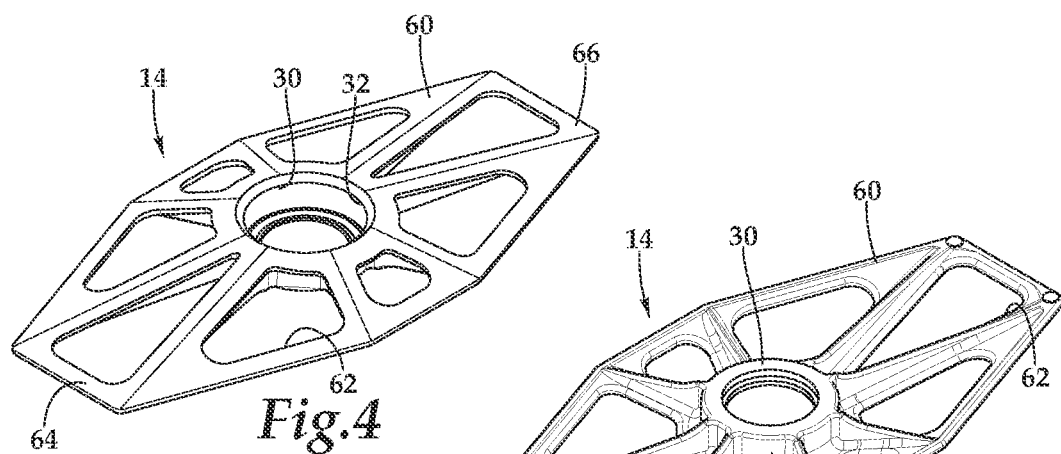
FIG. 4 is a front top perspective view of one embodiment of the arbor stake stabilization member used in FIG. 1.
Figure 5:
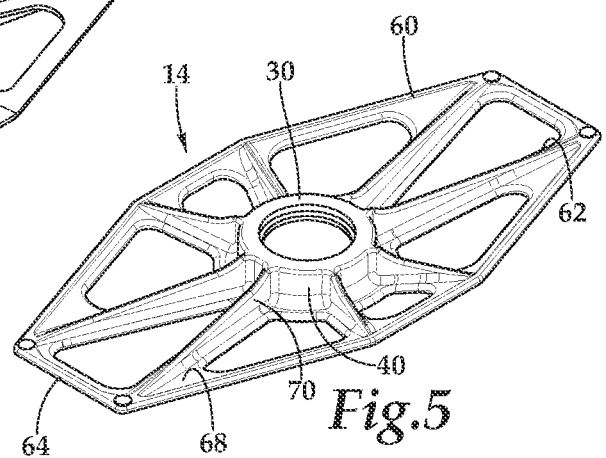
FIG. 5 is a front bottom perspective view of one embodiment of the arbor stake stabilization member used in FIG. 4.
Figure 6:
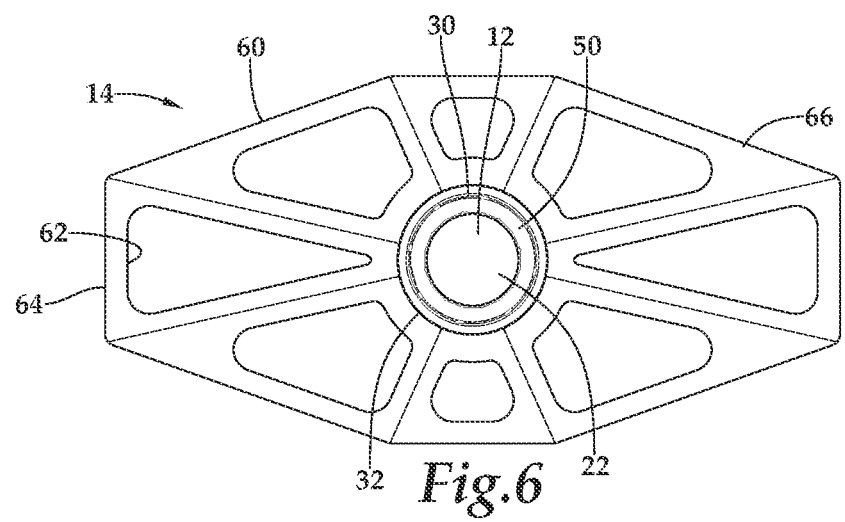
FIG. 6 is a top plan view of the arbor stake stabilization member depicted in FIG. 4.
Figure 7:
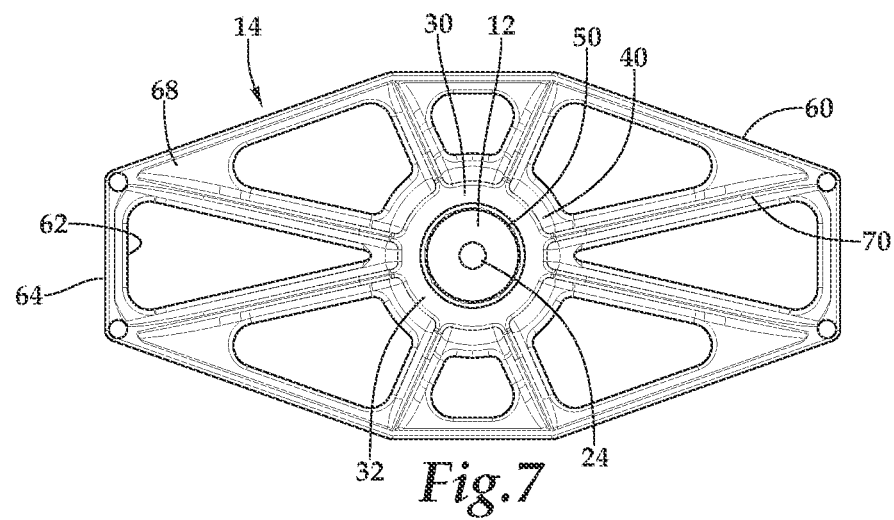
FIG. 7 is a bottom plan view of the arbor stake stabilization member depicted in FIG. 4.

Referring now to FIG. 2 through FIG. 9, the arbor stake 12 may be made of any of a variety of materials, and in some embodiments the arbor stake 12 may be made from a biodegradable material, such as wood, for example. In fact, the arbor stake 12 may be made of any material with enough longitudinal rigidity to allow the arbor stake 12 to be forced through a tree's rootball and into the underlying ground. Each arbor stake 12 includes tapered end 20 and a flat end 22. The tapered end 20 may include a point 24 for driving the arbor stake 12 into the tree's rootball B and the underlying soil S. The flat end 22, on the other hand, can, for example, be hit with a hammer or other object in order to drive tapered end 20 through a rootball B and into the soil S. An end cap 26 (shown in FIG. 2 and not shown in FIG. 3) may be placed over the flat end 22 during hammering in order to protect flat end 22 from direct hammer blows. The end cap 26 may stay on the arbor stake 14 or, alternatively, be removed after the arbor stake 14 is driven to its desired depth. The end cap 26 may be composed of a biodegradable material or a different, non-biodegradable material. As alluded, the arbor stake 12 may be referred to as providing vertical support. However, it is not required that the arbor stake 12 be arranged exactly vertically, as substantially vertically is within the scope of embodiments.

The arbor stake stabilization member 14 may also be made out of a variety of materials, and especially biodegradable materials, such as wood, bamboo, biodegradable plastic (hereinafter referred to as "bioplastic," an example of which is the corn-based plastic available under the name MIREL™), and the like. As shown in FIG. 10, the benefit of using a biodegradable material for the arbor stake stabilization member 14 and components thereof, is over time the arbor stake stabilization member 14 will degrade as shown by degradation D. Therefore, no need exists to return to the tree T to remove the arbor stake stabilization member 14 from the ground.

Referring again to FIG. 2 through FIG. 9, typically, the arbor stake stabilization member 14 is a long strip-like form of material with a thicknesses much smaller than a length and a width dimensions. The dimensions of each arbor stake stabilization member 14 can be tailored for its intended use. Further, embodiments presented herein are not limited to any dimension for arbor stakes 12 or arbor stake stabilization members 14, as dimensions may differ for different applications. The arbor stake stabilization member may be referred to as providing horizontal support. However, it is not required that the arbor stake stabilization member 14 be arranged exactly horizontally, as substantially horizontally, or otherwise conforming to a top surface of a rootball, is within the scope of embodiments.

In various embodiments, the arbor stake 12 is driven through a rootball of a newly-planted tree, while the arbor stake stabilization member 14 is placed parallel to the soil to provide lateral stability to the arbor stake 12. In one embodiment, the arbor stake stabilization member 14 includes a body 30 that is an annular ring 32 having a length 34 from an upper end 36 to a lower end 38. As shown, the annular ring 32 includes an exterior surface 40 and an axial passageway 42 therethrough. The annular ring 32 may be a biodegradable material.

The axial passageway 42 is sized to accept the arbor stake 12 therethrough. As depicted, the axial passageway 42 includes a periphery 44 and a center 46. A locking member 50 is coupled to the annular ring 32 and the locking member 50 extends radially inward into the axial passageway 42. The locking member 50 may partially obstruct the axial passageway 42 at the periphery 44 thereof and the locking member 50 is unobstructing of the center 46 of the axial passageway 42. The locking member 50 includes a contact material 52 with a contact surface 54 having, in one embodiment, a toothed-profile 56. In one implementation, the toothed-profile may make a biting engagement into the arbor stake 12. The contact material 52 may be different than the biodegradable material of the annular ring 32. In one implementation, the contact material 52 may be an unfinished metal.

As shown, the locking member 50 is sized to accept the arbor stake 12 therethrough in an interference fit with the toothed-profile 56 of the contact surface 54 of the locking member 50. In one embodiment, a plate 60 extends circumferentially outwardly from the annular ring 32. The plate 60 may have multiple openings 62. In one embodiment, the plate 60 may be composed of the same material as the annular ring 32 or another biodegradable material. The multiple openings 62 increase the exposed surface area of the plate 60 to increase the rate of biodegradation, when the arbor stake stabilization member 14 is beneath the surface of the ground. In one embodiment, the multiple openings 62 are non-arbor stake openings that are not sized to engage an arbor stake. In another embodiment, the multiple openings 62 may be at least 30% of the surface area of the plate 60. In still another embodiment, the multiple openings 62 may be at least 50% of the surface area of the plate 60.

In the illustrated embodiment, the plate 60 has a diamond-like shape 64 with a length greater than a width. The plate 60 may have an upper side 66 and a lower side 68. As shown, the plate 60 extends circumferentially outward from the annular ring 32 at an angle to span the length 34 of the annular ring 32. Multiple gussets 70 join the lower side 68 of the plate 60 to the exterior surface 40 of the annular ring 32. The gussets 70 provide additional support. It should be appreciated that other designs of plates 60 for the arbor stake stabilization member 14 are within the teachings presented herein. The size and shape of the plate 60 will vary depending on application and landscape design criteria. By way of example and not by way of limitation, with reference to FIG. 11, the plate 60 may have a form bounded by arcuate sides 80, 82.

The order of execution or performance of the methods and techniques illustrated and described herein is not essential, unless otherwise specified. That is, elements of the methods and techniques may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. An arbor stake stabilization system comprising:
   an arbor stake having a first end tapering to a second end, the second end for penetrating a rootball under a ground; and
   an arbor stake stabilization member including:
      a body being an annular ring having a length from an upper end and a lower end, the annular ring having an exterior surface and an axial passageway therethrough, the annular ring being a first material, the first material being a biodegradable material;
      the lower end of the body configured to be held at one of at the ground and under a surface of the ground;
      the axial passageway sized to accept the arbor stake therethrough from the upper end to the lower end such that the second end of the arbor stake travels from the upper end through the lower end to place the first end proximate the upper end of the body, the axial passageway having a periphery and a center;
      a locking member coupled to the annular ring, the locking member extending radially inward into the axial passageway, the locking member partially obstructing the axial passageway at the periphery thereof, the locking member unobstructing the center of the axial passageway;
      the locking member being a contact material with a contact surface, the contact material being a second material, the second material being a non-biodegradable material;
      the locking member sized to accept the arbor stake therethrough in an interference fit;
      a perforated plate extending circumferentially outwardly from the annular ring, the perforated plate having a plurality of openings, the perforated plate being a third material, the third material being a biodegradable material;
      the perforated plate having an upper side and a lower side, the perforated plate extending circumferentially at an angle to span the length of the annular ring; and
      a plurality of gussets joining the lower side of the perforated plate to the exterior surface of the annular ring.

2. The arbor stake stabilization system as recited in claim 1, wherein the first material and the third material are identical.

3. The arbor stake stabilization system as recited in claim 1, wherein the contact surface further comprises a toothed-profile.

4. The arbor stake stabilization system as recited in claim 3, wherein the interference fit comprises the toothed-profile of the contact surface biting into the arbor stake by way of a hammer-driven action on the arbor stake.

5. The arbor stake stabilization system as recited in claim 1, wherein the second material further comprises an unfinished metal.

6. The arbor stake stabilization system as recited in claim 1, wherein the second material further comprises an untreated oxidizable material.

7. The arbor stake stabilization system as recited in claim 1, wherein the plate further comprises a diamond shape with a length greater than a width.

8. The arbor stake stabilization system as recited in claim 1, wherein the biodegradable material of at least one of the first material and the third material, further comprises a biodegradable plastic.

9. An arbor stake stabilization system comprising:
   an arbor stake having a first end tapering to a second end, the second end for penetrating a rootball under a ground; and
   an arbor stake stabilization member including:
      a body being an annular ring having a length from an upper end and a lower end, the annular ring having an exterior surface and an axial passageway therethrough, the annular ring being a first material, the first material being a biodegradable material;
      the lower end of the body configured to be held at one of at the ground and under a surface of the ground;
      the axial passageway sized to accept the arbor stake therethrough from the upper end to the lower end such that the second end of the arbor stake travels from the upper end through the lower end to place the first end proximate the upper end of the body, the axial passageway having a periphery and a center;
      a locking member coupled to the annular ring, the locking member extending radially inward into the axial passageway, the locking member partially obstructing the axial passageway at the periphery thereof, the locking member unobstructing the center of the axial passageway;
      the locking member being a contact material with a contact surface having a toothed-profile, the contact material being a second material, the second material being an unfinished metal;
      the locking member sized to accept the arbor stake therethrough in an interference fit with the toothed-profile of the contact surface of the locking member, the interference fit being a toothed-profile of the contact surface biting into the arbor stake by way of a hammer-driven action on the arbor stake;
      a plate extending circumferentially outwardly from the annular ring, the plate being the first material;
      the plate having a plurality of openings, the plurality of openings non-engaging the axial passageway, the plurality of openings being at least 30% of the surface area of the plate;

the plate having an upper side and a lower side, the plate extending circumferentially at an angle to span the length of the annular ring; and a plurality of gussets joining the lower side of the plate to the exterior surface of the annular ring.

10. An arbor stake stabilization system comprising:

an arbor stake having a first end tapering to a second end, the second end for penetrating a rootball under a ground; and an arbor stake stabilization member including:

a body having a length from an upper end and a lower end, the body having an exterior surface and an axial passageway therethrough, the body being a first material, the first material being a biodegradable material;

the lower end of the body configured to be held at one of at the ground and under a surface of the ground;

the axial passageway sized to accept the arbor stake therethrough from the upper end to the lower end such that the second end of the arbor stake travels from the upper end through the lower end to place the first end proximate the upper end of the body, the axial passageway having a periphery and a center;

a locking member coupled to the body, the locking member extending radially inward into the axial passageway, the locking member partially obstructing the axial passageway at the periphery thereof, the locking member unobstructing the center of the axial passageway;

the locking member being a contact material with a contact surface, the contact material being a second material, the second material being a non-biodegradable material;

the locking member sized to accept the arbor stake therethrough in an interference fit such that the arbor stake stabilization member accepts the arbor stake therethrough, the interference fit being a toothed-profile of the contact surface biting into the arbor stake by way of a hammer-driven action on the arbor stake; and a plate extending circumferentially outwardly from the body, the plate having a plurality of openings, the plate being a third material, the third material being a biodegradable material.

* * * * *